C. F. ECKART.
METHOD AND MEANS FOR ENHANCING THE GROWTH OF PLANTS.
APPLICATION FILED SEPT. 27, 1920.
1,372,998.
Patented Mar. 29, 1921.
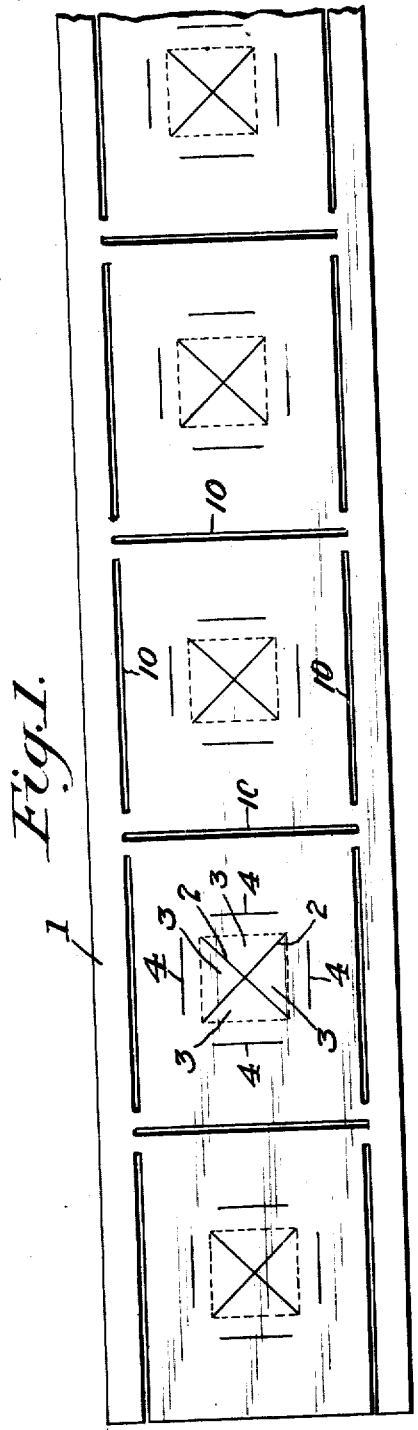
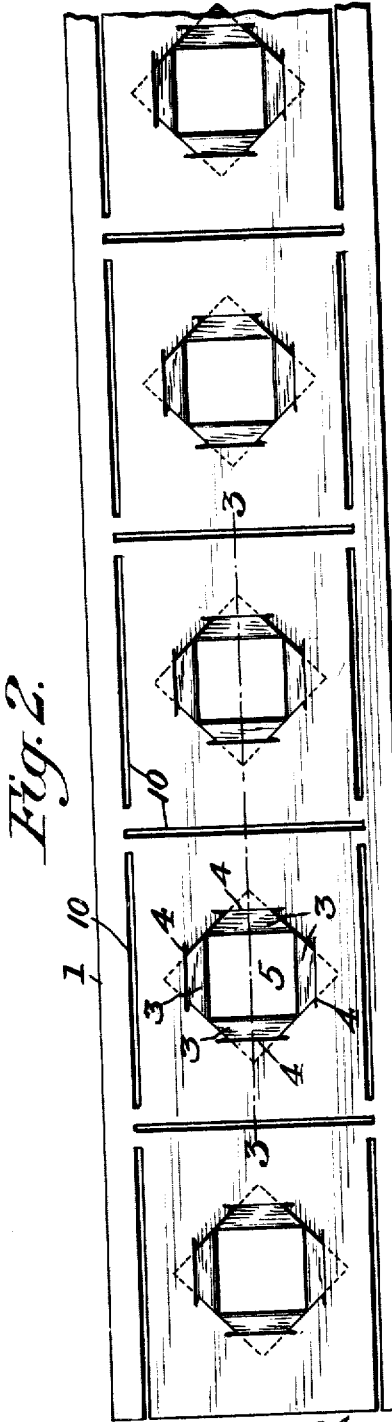
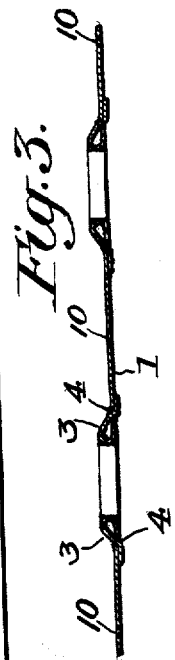
Inventor.
Charles F. Eckart
By Chas. J. O'Neill
Atty.

UNITED STATES PATENT OFFICE.

CHARLES F. ECKART, OF OLAA, TERRITORY OF HAWAII.

METHOD AND MEANS FOR ENHANCING THE GROWTH OF PLANTS.

1,372,998. Specification of Letters Patent. Patented Mar. 29, 1921.

Application filed September 27, 1920. Serial No. 413,173.

*To all whom it may concern:*

Be it known that I, CHARLES F. ECKART, a citizen of the United States, residing at Olaa, Territory of Hawaii, (whose post-office address is Olaa, Hawaii, Territory of Hawaii,) have invented certain new and useful Improvements in Methods and Means for Enhancing the Growth of Plants; and I do hereby declare the following to be a full, clear, and exact description of the invention, such as will enable others skilled in the art to which it appertains to make and use the same.

The invention relates to a simple and effective method and means for enhancing the growth of plants, involving the suppression of weeds and deleterious plants, the provision of the suitable soil area about each plant to receive light and moisture, the collection of moisture from rain fall and other sources and the distribution of the same to the soil outside of the defined planting area, and the development of ideal conditions of heat and moisture in the soil adjacent the planting areas which will materially enhance the growth and development of the plant roots, as well as the rapid development of the plants proper, so that the yield from the latter will be greatly augmented.

The invention is carried into effect by means of a novel form and construction of mulsh, adapted to be superimposed on the soil in which the plants are to develop, the mulsh serving first, to promote rapid development and germination of the seeds, roots or bulbs of weeds or objectionable plants and subsequently to smother and destroy the weeds and objectionable plants; second, to provide openings to expose the soil areas in which the desired plants are located, by excising certain portions of the covering mulsh, preferably by forming foldable flaps in the mulsh over the planting areas, folding the flaps backward over the top surface of the mulsh and securing the ends of the flaps in slits or openings formed in the mulsh, to retain the flaps in their locked and open position, and third, to provide the mulsh or covering with additional openings located beyond, and not connected with, the planting openings and the flaps, which serve to receive the moisture collecting on the covering or mulsh, from rains or other sources, and deliver the same into the soil so that the soil areas surrounding the plants and more or less remote from the latter, in the initial stages of development, will be maintained in an ideally moist condition to induce the spreading of the plant roots into these moistened areas, the said covering or mulsh also serving to absorb and transmit the heat from the sun to the subjacent soil areas and thereby further promote or enhance the development of the plant roots, as well as the body of the plant projecting above the soil.

In the accompanying drawings:

Figure 1 is a plan view of a section of a mulsh, by means of which the method may be carried into effect;

Fig. 2 is a similar view of the mulsh as applied to the surface of the ground with the flaps surrounding the planting openings turned back and locked in position;

Fig. 3 is a section on line 3—3 of Fig. 2.

Referring to the drawings, 1 indicates the body portion of the mulsh proper, which is formed from a long strip or sheet of flexible dark colored, water-proof paper, which is laid in surface contact with the ground in which the plants or plant producing stock are to be set or may have been set previous to the laying of the mulshing strip. Preferably at regular intervals, corresponding to the soil areas in which the individual plants are located or are to be located, the mulsh is provided with slits or incisions to produce a series of flaps, which when folded back will overlie the upper surface of the mulsh, forming openings in the mulsh which expose the soil areas immediately surrounding or which will immediately surround the plants or plant producing stock when they are set out. These flaps may be of any desired or convenient form and in the particular exemplification of the invention illustrated, the flaps 3 are formed by two cross cuts or slits 2—2 which intersect each other so as to form four triangular flaps 3, which, when folded back, on lines connecting the outer ends of the slits 2, produce a substantially square opening 5 in the mulsh which constitutes the planting opening. Disposed about each planting opening 5 in the body of the mulsh, is a series of slits 4, which are adapted to receive the outer ends of the flaps 3 when the latter are folded back, said ends being passed through the slits 4, as illustrated in Figs. 2 and 3, whereby the flaps are locked in open position and constitute an inclined rim about each planting opening in the mulsh, which serves to deflect any weed seeds which would be washed through the planting openings onto the planting areas, and also to direct the greater part of the moisture, in the form of rain or water otherwise applied to the surfaces of the flaps, away from the planting openings and through the slits 4 in the mulsh, into the soil below the mulsh. These flaps likewise form a barrier against water which would otherwise drain from the body of the mulsh into the planting area.

As heretofore indicated it is highly desirable that any moisture from rains or other sources falling on the mulsh be directed into the soil surrounding the planting areas where it may be retained, with minimum evaporation, to be supplied to the plants to promote the extension and development of plant roots and therefore the concurrent growth of the plants as a whole. To effect this object openings are formed in the mulsh surrounding the planting openings 5 and at appropriate distances therefrom, as for example, by forming elongated slits 10 disposed in rectangular arrangement, as illustrated, through which openings the greater part of the moisture falling on the surface of the mulshing strips passes directly into the soil and is distributed throughout the same in zones surrounding the plant, and as the roots of the latter naturally seek and ramify into these moist zones, which are warmed by the solar heat radiated from the mulsh, the development and growth of the roots is enhanced to a marked degree. The openings 10, being long and narrow, afford ample areas for proper drainage of the water from the mulsh surface, but the relatively small openings check and greatly reduce the evaporation of the entrapped moisture from the soil, in fact the evaporation becomes practically negligible.

In carrying out the novel method constituting one phase of the present invention, the long strips of flexible, dark colored, water-proof covering material, which for maximum results is formed of suitable paper impregnated with asphalt, tar, pitch or similar water-proofing and heat absorbing material, are laid on the prepared surface of the ground and serve first, to promote the rapid development and germination of the weed seeds and the subsequent extermination of the weeds by excluding the necessary light and air therefrom. The slits or incisions which form the flaps, and those which lock the flaps and constitute drainage openings in the mulsh, may be made either before or after the mulsh is applied, and similarly the mulshing strips may be applied over the plant beds either before, which is the preferred form, or after the plants or plant producing stock are set out. If the plants have already been set out in the plant beds at regularly spaced intervals corresponding to the openings 5 in the mulshing strips or coverings the latter may be superimposed on the soil by first folding back, and, if desired, locking the flaps so as to open up the areas 5 and permit the plants to project therethrough. On the other hand, if, as in the preferred form, the planting is to be effected only after the weeds have been exterminated, the mulshing strips are laid over the plant beds in proper order so that the entire soil area covered by the mulshing strips will first be freed of weeds, and after this has been accomplished the flaps are formed, turned back, and locked in position to expose the planting areas through the openings 5, into which the plants or plant producing stock are then set, this being supplemented of course by the formation of the required drainage openings, 10. It is to be understood that by "planting areas" is meant the soil areas which are exposed by the openings 5 (Fig. 2) in the mulshing strips or coverings, and these so-called planting areas are the circumscribed portions of the soil which are to receive the plants or plant producing stock or in which the plants or plant producing stock have been set out, depending upon the procedure followed. By the term "plant bed" is meant the prepared ground or soil area upon which the entire mulshing strip or covering is superimposed; in other words it is the soil mass, underlying or within the borders of the mulsh, which accommodates the roots of the treated plants. The expression "planting opening" is intended to designate the opening in the mulsh which exposes the planting area, and through which the plant or plant producing stock is set in the soil or through which it projects from the soil.

With the fall of rain or water from any other source, the mulsh acts as a water shed, and the natural drainage from the surface of the mulsh leads the larger part of the water which falls on the mulsh through the long narrow openings 10 into the subjacent soil. A relatively smaller portion of the water drains through the slits 4 into the soil; this latter includes the water which strikes the inclined surfaces of the flaps, which act as small water-sheds, and also much of the water passing under the flaps. The water which gains access to the soil through the openings 10 naturally penetrates the soil to a much greater depth than that which falls directly on the exposed soil area through the openings 5, by reason of the fact that the water draining from the greater part of the mulsh surface, passes through said openings 10, in addition to that water which falls directly, as rain for instance, on the relatively very small exposed soil surface at 10. It will thus be seen that even a very light rain, which would under ordinary circumstances simply moisten a shallow surface layer of the soil and quickly evaporate, will, as a result of the application of the present invention, cause certain restricted zones of the soil adjacent to the planting area to become moistened to a considerable depth and that the moisture will be retained or trapped in the soil, as the openings 10 afford relatively small evaporating surfaces. A very much larger amount of water is therefore rendered available to the growing plants than in the ordinary practice.

It will be particularly noted that water penetrates and accumulates to a greater extent in the soil zones which are supplied through the openings 10, than is the case with the zones supplied through the slits 4 or through the planting openings 5. This results in different soil zones created around the plant which contain different amounts of water and that the penetration of this water into the soil and likewise the amount of water in the soil increases as the distance increases from the plant openings to the drainage openings 10. Furthermore, since solar heat is absorbed in large quantities by the dark colored covering or mulshing strips and radiated into the soil mass, the soil temperature becomes elevated above that which would ordinarily prevail in the conventional agricultural practice. The effect of the stored heat and the graded moisture zones in the soil surrounding the plant area, under the conditions described, is a stimulation of root development and extension outwardly and downwardly from the point at which the plant projects from the soil, and it is the creation of these conditions with which the present invention is primarily concerned. The enhanced root development and extension, obtained in the manner described, is naturally reflected in a materially enhanced development of the whole plant. Due to the different zones, containing different amounts or proportions of moisture, which are created within the soil, it will be seen that no matter what the weather conditions may be with respect to rail fall, there will be certain parts of the soil mass underlying the covering, which will contain optimum moisture conditions for root development.

While other devices have been used to lead the water from the rain or other sources toward the points at which plants project from the soil, the present invention differs radically therefrom, in that it provides for the diversion of the water from such points and causes the water to penetrate and distribute itself throughout the soil mass in a manner which will effect the greatest root development and extension. It will therefore be seen that in respect of the radiation of solar heat into the soil and the diversion of water into zones more or less remote from the body of the plant, and the retention of the water in the soil by the overlying covering, practically ideal conditions are established and maintained to produce a maximum growth and development of each plant as a whole.

What I claim is:

1. The method of enhancing the growth of plants, which comprises superimposing a covering on the ground, excising portions of the covering to expose soil areas for the plants, and forming openings in the covering at sections outside of the planting areas to receive drainage water from the covering and deliver the water to zones of the soil outside the planting areas.

2. The method of enhancing the growth of plants which comprises superimposing a covering on the ground, slitting the covering to form flaps, turning back the flaps to expose soil areas for the plants, and forming openings in the covering at sections outside the planting areas to receive drainage water from the covering and deliver the water to zones of the soil outside the planting areas.

3. The method of enhancing the growth of plants which comprises superimposing a covering on the ground, slitting the covering to form flaps, turning back the flaps to expose soil areas for the plants, locking the flaps in open position by passing the outer ends thereof through slits in the covering, and forming openings in the covering at sections outside the planting areas to receive drainage water from the covering and deliver the water to zones of the soil outside the planting areas.

4. The method of enhancing the growth of plants which comprises superimposing a thin flexible covering of water-proof heat absorbing material on the ground, slitting the covering to form flaps, turning back the flaps to expose soil areas for the plants, locking the flaps in open position by passing the outer ends thereof through slits in the covering, and excising portions of the covering at sections outside of the planting areas to receive drainage water from the covering and deliver the water to zones of the soil outside the planting areas.

5. A mulsh for enhancing the growth of plants, comprising a strip of flexible waterproof material provided with an opening to expose a plant receiving area of soil, and drainage openings disposed at intervals about the planting opening to deliver drainage water from the surface of the mulsh to zones of the soil outside the planting area.

6. A mulsh for enhancing the growth of plants, comprising a strip of flexible waterproof material, having sets of intersecting slits disposed at spaced intervals to form foldable flaps, means for locking the flaps in open position to define planting openings in the mulsh, and openings outside of the flaps to deliver drainage water from the surface of the mulsh to zones of the soil outside the planting areas.

7. A mulsh for enhancing the growth of plants, comprising a strip of flexible waterproof material, having sets of intersecting slits disposed at spaced intervals to form foldable flaps, slits adjacent the flaps to receive the free ends thereof to lock the flaps in open position and define planting openings in said covering, and openings outside of the flaps to deliver drainage water from the surface of the mulsh to zones of the soil outside the planting areas.

8. A mulsh for enhancing the growth of plants, comprising a strip of flexible waterproof material, sets of cross slits disposed at spaced intervals to form triangular foldable flaps, means for locking the flaps in open position to form openings for the plants, and openings outside of the flaps to deliver drainage water from the surface of the mulsh to zones of the soil outside the planting areas.

9. A mulsh for enhancing the growth of plants, comprising a strip of flexible waterproof material, having sets of intersecting slits disposed at spaced intervals to form foldable flaps, slits adjacent the flaps to receive the free ends thereof for locking said flaps in open position to form openings for the plants, and a series of long narrow openings disposed about the plant openings to deliver drainage water from the surface of the mulsh to zones of the soil outside the planting areas.

10. A mulsh for enhancing the growth of plants, comprising a strip of flexible waterproof material provided with an opening to expose a planting area, and means for draining such water, as falls upon or is applied to the body surface of the mulsh, away from the planting area and into separate areas of soil, circumscribed by the body of the mulsh, which are in spaced boundary relation to the planting area.

In testimony whereof I affix my signature.

CHARLES F. ECKART.